United States Patent Office 3,352,221
Patented Nov. 14, 1967

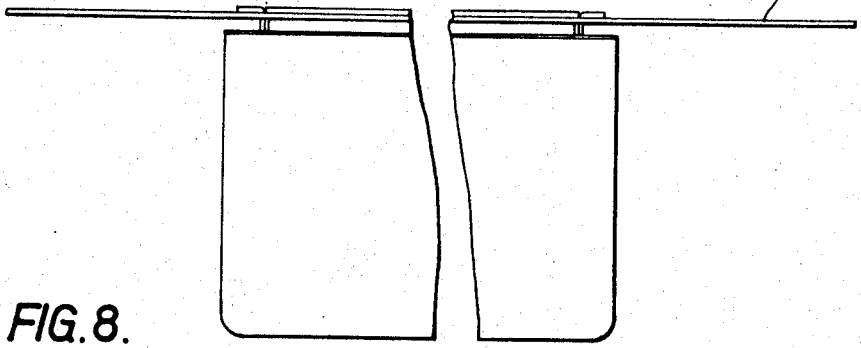
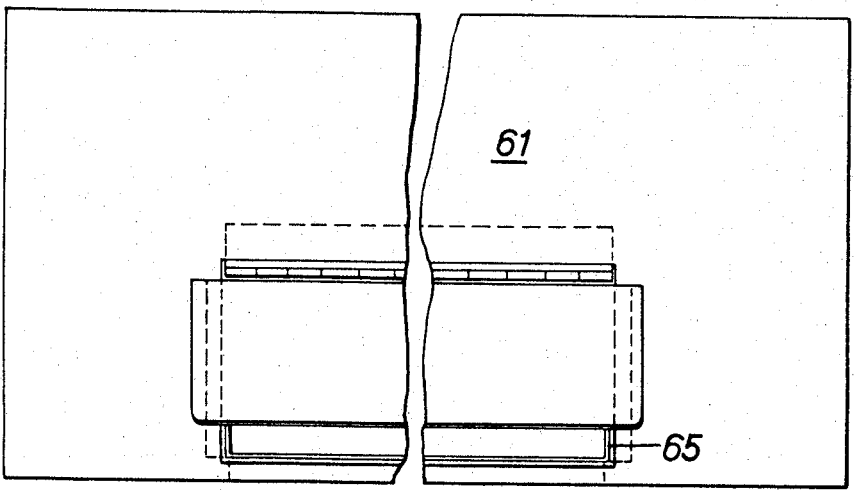

3,352,221
CHROMATOGRAPHY
James Owen Barron and Trevor John Coomes, London, and Ronald David Charles Bone, Upminster, Sussex, England, assignors to Shandon Scientific Company Limited, London, England, a British company
Filed Dec. 28, 1964, Ser. No. 421,168
Claims priority, application Great Britain, Jan. 3, 1964, 436/64
9 Claims. (Cl. 95—11)

This invention relates to chromatography and is particularly concerned with recording the result of a chromatographic run where a chromatogram is produced. The invention is particularly suited to thin-layer chromatographic techniques where the adsorbent is represented by a thin coating applied to one face of a sheet or strip of material, which may be glass, plastic or the like.

Chromatographic techniques in which components of a simple or complex mixture are separated from one another in the gaseous or liquid phases by contacting an adsorbent layer are well known. In the case of thin-layer chromotography, the thin layers are themselves relatively fragile and the substances separated during the run are often impermanent so that it is necessary to provide from the chromatogram a permanent record of the spot patterns produced by the separated components.

Separated spots on a chromatogram may be located by a variety of procedures. If they are coloured components, their positions are visible to the eye. If they are colourless then their positions may be fixed by spraying the chromatogram with either a specific or a general colour locating reagent which causes the spotted areas to contrast with the remainder of the surface of the chromatogram. Some component substances fluoresce under ultra-violet light and this feature may be utilized to determine the spot positions by subjecting the surface of the chromatogram to a maintained ultra-violet irradiation and then marking on the chromatogram the position of the fluorescing spot by means of a stylus or other marker.

Spots due to coloured compounds, or those colourless compounds whose presence has been demonstrated by the use of sprayed-on locating reagents may be readily recorded by photo-copying, in conjunction with suitable filters to aid contrast. Spots due to colourless compounds which fluoresce when irradiated with filtered ultra-violet light and do not suffer from photo-degradation can also be readily determined. However some compounds which are colourless and which fluoresce under ultra-violet light suffer photo-degradation and disappear from the chromatogram when subjected to maintained ultra-violet light. It will be appreciated that this poses problems if a chromatogram spotted with such a compound is to be examined for any length of time as the photo-degradation may cause the spot to disappear completely before the examination of the chromatogram is completed. Also such a chromatogram is incapable of providing a permanent record.

An object of this invention is to overcome these disadvantages.

According to the present invention a method of determining the presence in a chromatogram of a substance liable to photo-degradation, comprises momentarily irradiating the chromatogram with a flash of ultra-violet light and simultaneously photographing it.

The invention makes use of the phenomenon discovered by the applicants that a compound suffering photo-degradation and which fluoresces in ultra-violet light can be photographed with substantially no photo-degradation by subjecting the spots to a flash of relatively high intensity ultra-violet light such as can be produced by a flash gun with an appropriate filter. The duration of the flash is of the order of a few hundred milliseconds only.

In accordance with a second feature of the invention the quantity of the compound producing the fluorescent spot can be determined by comparing the intensity of the spot as it appears on the photographic record with a calibration record. Thus the invention enables not only the identity of the compound to be determined but also its amount.

The present invention also provides apparatus suitable for photographing a fluorescent spot on a chromatographic separating layer, comprising an enclosure in which the surface under investigation is to be placed, equipment for irradiating the position of the surface in the enclosure with a flash of ultra-violet light, and a camera directed towards said position and connected to be operated in unison with the flash equipment to photograph the surface of the layer while it is being irradiated with the flash of ultra-violet light.

Preferably the flash is produced by two flash guns operated together and each so disposed that the flash of ultra-violet light is incident on the photographic position at an angle of 45 degrees to its plane. Preferably the field of view of the camera is spanned by a filter which transmits only visible light which has a wavelength greater than that generated by the flash of ultra-violet light. This has the advantage that fogging of the photographic record caused by the flash is avoided and yet the spots which are fluorescing, that is to say producing light at a longer wavelength than the incident ultra-violet light, pass light through the filter and are photographed on the film.

In place of flash guns flash tubes may be used. It is important, however, to ensure that the equipment for producing the flash of ultra-violet light is so positioned that the intensity of the useful wavelength of ultra-violet light is substantially uniform over the surface under investigation. The intensity will vary with the type of equipment used, its distance from the surface under investigation and any filters interposed between the flash equipment and the surface. In this connection it should be borne in mind that glass is a poor transmitter of ultra-violet light and starts to attenuate it at about 3200 A. and transmits virtually no ultra-violet light at a wavelength of 4000 A. or less. As a result it may be necessary in carrying out the invention to modify normal flash equipment by removing any glass baffles or screens, in order to obtain an adequate intensity of ultra-violet light at, say, 2537 A. or 3650 A. Also quartz envelope flash tubes should be used in preference to glass, as they pass more ultra-violet light. The preferred wavelength of the flash of ultra-violet light for most purposes is either 3650 A. or 2537 A.

The invention will now be described in more detail, by way of example, with reference to the accompanying drawings, in which:

FIGURE 6 shows one of the P.L.C. plate supports in section;

FIGURE 7 is a top plan view of FIGURE 6; and,

FIGURE 8 is a front elevation of the support of FIGURE 6.

Figure 1:
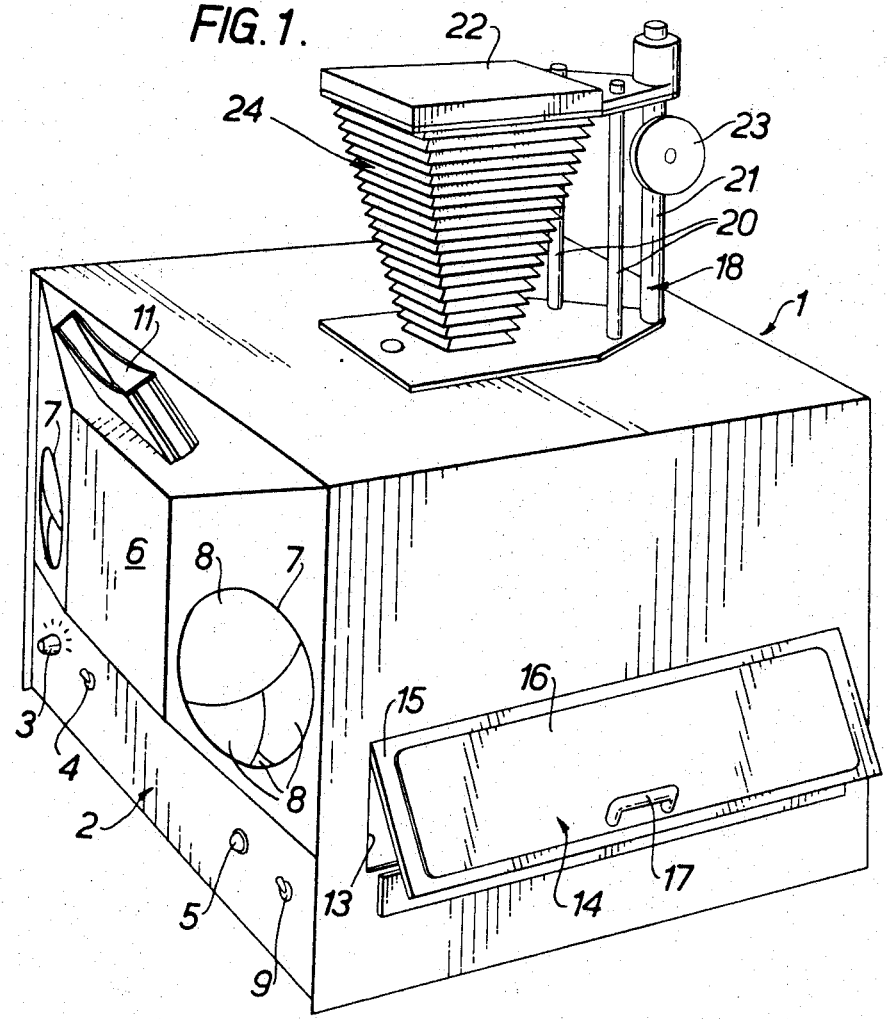
FIGURE 1 is a perspective view of one form of apparatus showing the front, top and one side.

Referring to FIGURE 1 the apparatus comprises a generally cubical cabinet 1 of light metal construction and having a front panel 2 provided with operating switches 3, 4 and 9 and a control light 5. Above the control panel is a slightly outwardly protruding front cover 6 provided at opposite sides with hand-holes 7 each of which is normally closed by an iris of four overlapping pliant rubber vanes 8 which yield to allow an operator's hand to be inserted into the cabinet 1 but which return to the position shown when the operator's hand is withdrawn to prevent the ingress of light through the hand-hole. The front cover is also provided with a viewing mask 11 having a pliant edge shaped to fit the face of an operator when viewing the interior of the cabinet. A slot (not shown) is provided in the front cover beneath the mask and is spanned by an ultra-violet light filter 12 shown in FIGURE 3.

In opposite side-walls of the cabinet 1 are rectangular openings 13 normally closed by doors 14 to prevent the ingress of light. Each door 14 comprises a resilient rubber web 15 sealed along its upper edge to the cabinet above the opening and strengthened by a face plate 16 to which a handle 17 is attached. The portion of the web 15 between the face-plate and the cabinet provides a hinge biassed to hold the door 14 closed.

A camera stand 18 is mounted centrally on the top of the cabinet 1 and comprises a pair of guide rods 20 and a thicker support rod 21. The support rod 21 is formed with a channel extending lengthwise and in which is mounted a rack (not shown). A camera assembly 22 is vertically moveable along the support rod and is provided with a pair of finger-wheels 23 which rotate pinions co-operating with the rack to provide fine and coarse adjustment of the vertical position of the camera assembly. A bellows 24 extends between the camera assembly and an aperture 19 (see FIGURE 5) in the top of the cabinet so that the camera is able to photograph the interior of the cabinet through the opening. In this embodiment of the invention a variable focus camera is used but in some circumstances it may be preferred to use a fixed focus camera rigidly secured to the top of the cabinet.

Figure 3:
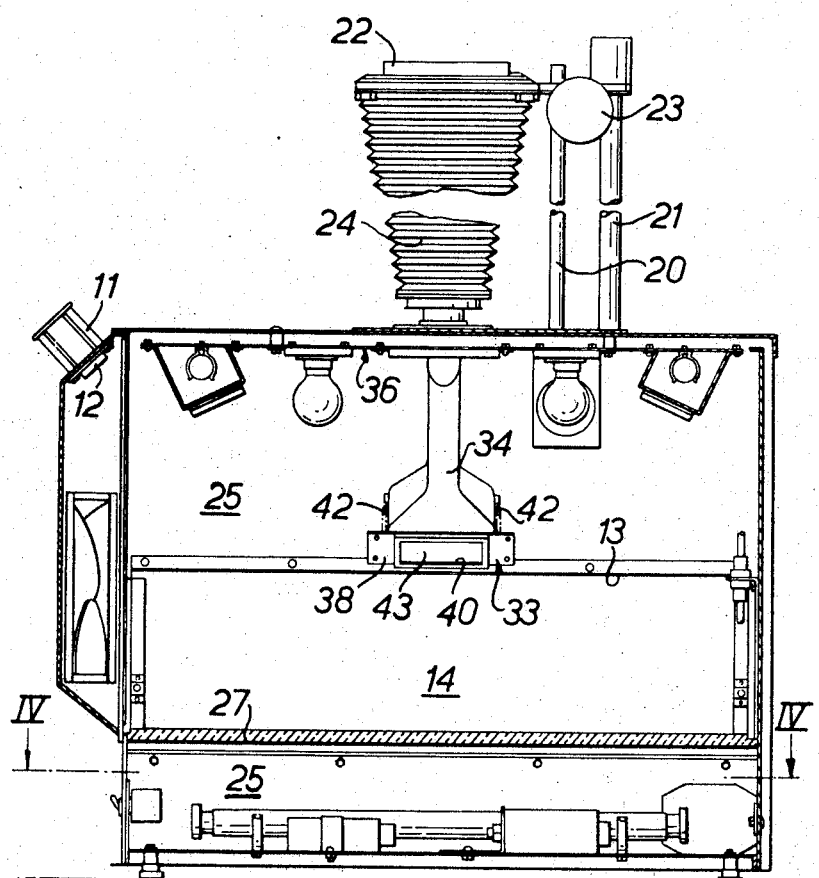
FIGURE 3 is a section through FIGURE 2 taken on the line and in the direction indicated by the arrows III—III in that figure, the front cover being replaced and the detachable supports removed.

The interior of the cabinet will now be described with reference to FIGURE 3. As is customary with photographic equipment all surfaces of the interior of the cabinet from which spurious reflections or refractions of light can be obtained are coated with optically flat black material.

Figure 4:
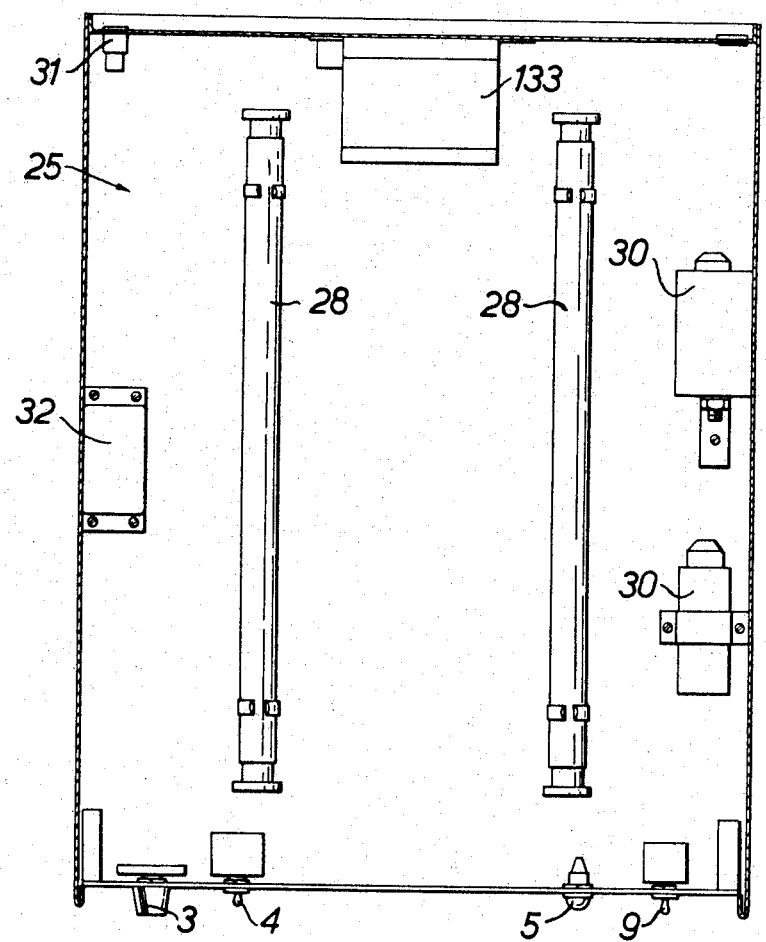
FIGURE 4 is a section through FIGURE 3 taken on the line and in the direction indicated by the arrows IV—IV in that figure.

The cabinet is internally divided into upper and lower compartments 26 and 25 by a flat glass diffusing plate 27 having its upper surface matt to prevent it acting as a reflecting surface. The lower compartment is situated behind the control panel 2 and is shown in plan in FIGURE 4. Referring to this figure the compartment 25 contains two fluorescent tubes 28, a pair of capacitors 30, a mains plug 31, a choke 32 and a ballast choke 133 all of which are interconnected by control circuitry (not shown) to the switches on the control panel 12. The base of the compartment 25 is perforated to facilitate the fitting of components to it.

Figure 2:
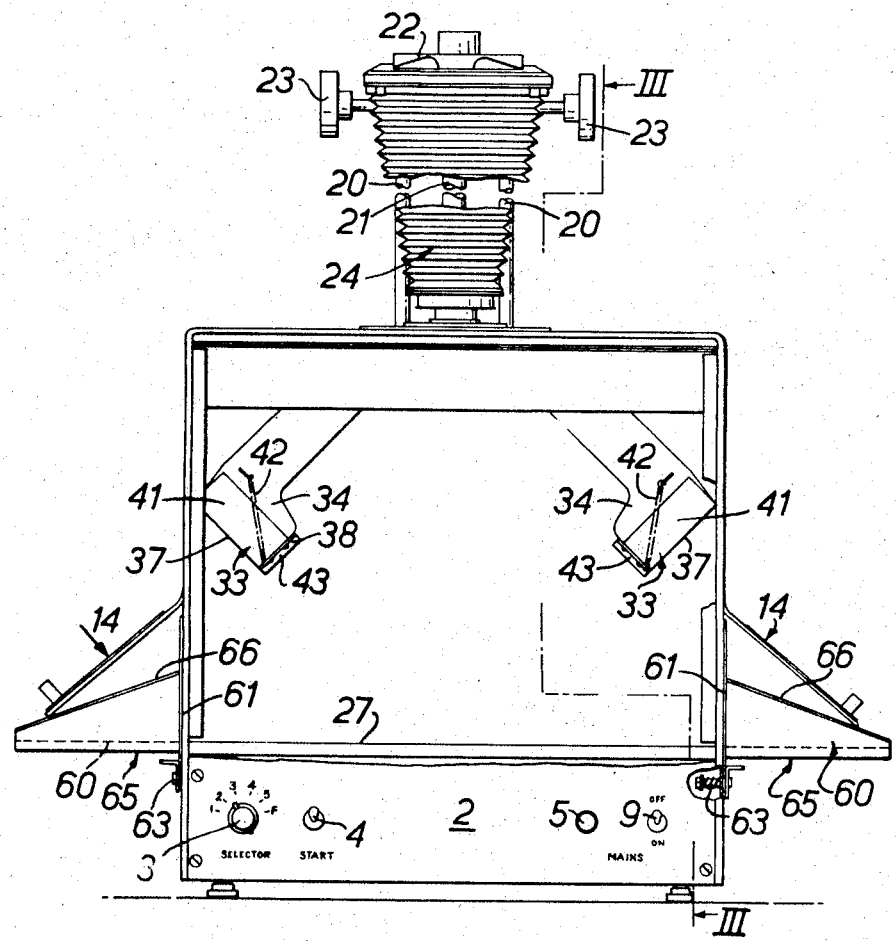
FIGURE 2 is a front elevational view, with parts broken away, of the apparatus from which a front cover bearing a viewing mask and hand-holes has been removed to expose the interior, and which has been modified by the addition of detachable supports at each side for preparative layer chromatography (P.L.C.) plates.

The upper surface of the diffusing plate 27 is co-extensive with the under edges of the rectangular openings 13 in each side of the cabinet. At each side of the cabinet above the level of the openings 13 is a bracket 33 for a flash gun as shown in FIGURE 2. The flash gun is of inverted hammer shape, the head of the hammer resting on the bracket 33 and the tail of the hammer extending upwards to the region of a lamp-plate 36 shown in FIGURE 3. The bracket 33 has a sloping floor 37 at an angle of 45 degrees to the centre of the diffusing plate 27 so that light emitted by the flash gun is incident on the centre of the plate 27 at this angle. The lower end of the floor 37 terminates in an end-plate 38 formed with a window 40 through which the flash is projected. Side-plates 41 at each side of the floor 37 prevent sideways movement of the flash gun and a pair of springs 42 extending from each side of the flash gun to the end-plate 38 hold the flash gun firmly to the bracket 33. Immediately in front of each window 40 is a filter 43 which ensures that only ultra-violet light of a wavelength of 3650 A. is directed towards the plate 27. The flash guns and filters 43 are so arranged that they operate to illuminate the portion of the diffusing plate 27 in the field of view of the camera with a uniform intensity of ultraviolet light at a wavelength of 3650 A.

Figure 5:
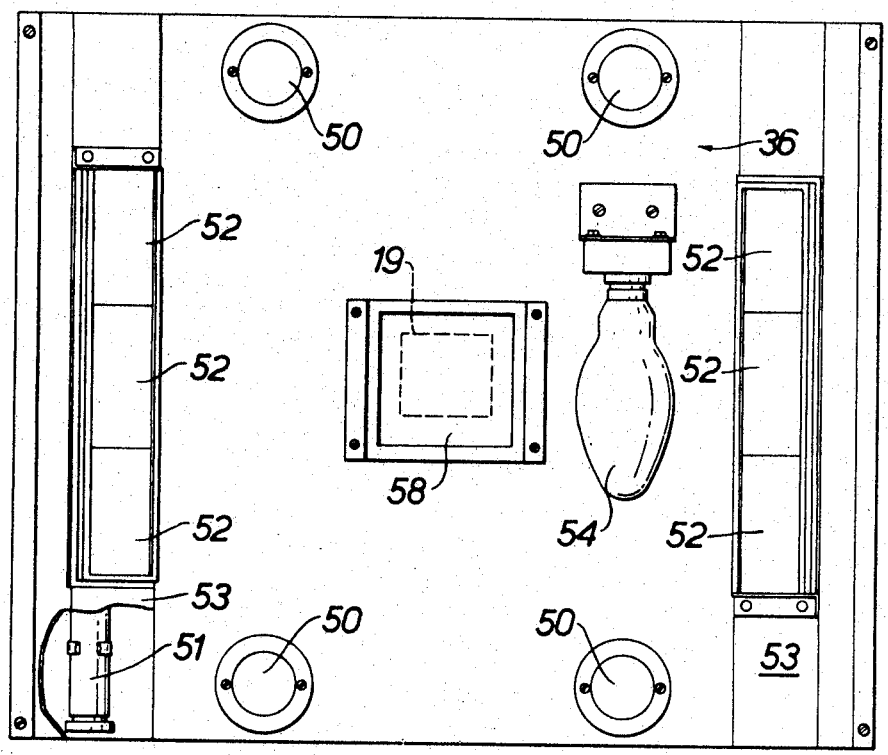
FIGURE 5 is a view of the underside of a lamp-plate assembly mounted in the top of the apparatus as shown in FIGURE 3, parts being broken away for the sake of clarity.

FIGURE 5 shows the lamp plate 36 in more detail. Three sources of illumination are supported by the lamp plate, the different sources being selectable at will by the selector switch 3 on the front of the panel. The first source is direct illumination. This is provided by four 25-watt electric filament light bulbs 50 spaced two at each side of the lamp plate. The second source is provided by a pair of 15-watt tubes 51 operated together and mounted behind cowls 53 extending respectively along the front edge and rear edge of the lamp plate 36. Each lamp 51 delivers ultra-violet light which is transmitted through a rectangular window in each cowl towards the diffusing plate 27. The cowl windows are each provided with three panes 52 of filter glass for transmitting light of a wavelength of 2537 A. only, and the abutting edges of the panes are mitred and overlap one another so that there is no leakage path for light between them. The third source of illumination is provided by a single ultra-violet light bulb 54 of 125 watts which may be operated alone or simultaneously with the tubes 51 according to the position of the switch 3. The bulb 54 is adapted to transmit ultra-violet light of a wavelength of 3650 A.

In the centre of the lamp plate 36 is a square opening registering with the aperture 19 and spanned by a filter plate 58 which transmits light having a wavelength greater than 4000 A. only. Thus fogging of the photograph taken by the camera by ultra-violet light reflected inside the cabinet is prevented.

The apparatus is used as follows. Under normal conditions with the switch 3 in position "1" the two tubes 28 beneath the diffusion plate 27 are operated to provide diffused light to the interior of the cabinet so that the operator is able to position the chromatogram inserted through one or other of the side openings 13 in the field of view of the viewing mask 11 and the camera. To assist him the upper surface of the diffusing plate 27 may be provided with guide lines. When the chromatogram has been positioned the operator closes the door 14 and selects the type of illumination he wants. As soon as the switch 3 is moved from position "1" the tubes 28 are de-energised.

In position "2" of the switch normal white light from the four bulbs 50 illuminates the chromatogram. In position "3" of the switch 3 the white light is replaced by ultra-violet light from the two tubes 51 obtained by way of the filter panes 52, the light being of 2537 A. wavelength. In position "4" of the switch the 2537 A. ultra-violet light is replaced by ultra-violet light at 3650 A. obtained from the 125 watt ultra-violet light bulb 54. In position "5" of the switch simultaneous illumination by ultra-violet light of 2537 A. and 3650 A. is obtained by energising the tubes 51 and bulb 54 together. In position "F" of the switch 3 the flash guns 34 are operated simultaneously with the camera. If desired the camera may be operated independently in any of the switch positions 2 to 5 to record permanently the pattern on the chromatogram. Alternatively the positions of spots on the chromatogram may be marked by the operator while the chromatogram is illuminated, by inserting his hands through the hand-holes 7 while peering through the mask and marking the spot outlines or positions with a stylus or other suitable marker.

The flash guns are adapted to give a repetitive flash of a precisely measured duration. The duration of the flash should approximate to the exposure time of the camera. In practice, with films currently available, the flash duration should lie in the range 500–1000 milliseconds but the longer it is, the better will be the photograph obtained, assuming, of course, the film used in the camera is suitable for the exposure time selected. It is found that it is possible to determine the amount of many substances present by comparing the intensities of the spots as they appear on the photograph with calibration spots produced under precisely the same conditions by known amounts of the substances. Naturally for such analysis it is essential for the bursts of illumination produced by the flash guns to be reproduceable.

Preferably the apparatus is used in conjunction with chromatographic plates. Such plates may be prepared by coating glass plates 20 cm. x 20 cm. or 20 cm. x 10 cm. or 20 cm. x 5 cm. with a thin layer of a slurry of a suitable material such as "Kisselgel G" by use of a suitable coating apparatus such as that described in copending patent application No. 406,991 which enables a uniform thickness of the slurry to be obtained on all of the plates. The coated plates are then dried at room temperature for an hour and then at 100° C. in a forced-draught oven for a further hour. They are then allowed to cool to room temperature and stored in a desiccator until they are required for use and for a period of at least 18 hours.

Solutions of a suitable concentration of both the sample to be analysed and the standard for comparison purposes are then applied to the prepared plates 1½ cms. from their base edges by means of a micrometer syringe.

The plates are then developed by suitable solvent systems in a conventional manner in glass tanks over a solvent path length of about 10 cms. The solvent is then dried off in air and the plate is then ready for copying.

In one example of apparatus the flash guns were each of the type known commercially as the "Mecatwin 502" and the filters 43 in front of them were of the type known as "Chance-Pilkington OX9A" ultra-violet light transmitting filters. The power of the flash produced by the flash guns was 120 watt-seconds and the duration of the flash was 720 milliseconds. The filter plate 58 was of the type commercially known as a "Wratten 2B" filter. The photograph was obtained on 4 in. x 5 in. Ilford H.P. 3 photographic plate and the camera aperture setting was f/8. The lens to subject distance was computed to give a reproduction ratio of 1:1.

In a technique known as preparative layer chromatography (P.L.C.) plates may be used of upwards of one metre in length which is considerably wider than the width of the cabinet 1. To accommodate such plates supports 60, shown in FIGURE 2, may be used. The function of the supports 60 is to keep the level of light entering the cabinet down to an acceptable value, and they are detachably fitted to the rectangular openings 13 at each side of the cabinet 1 as shown in FIGURE 2.

Referring to FIGURES 6 and 8 the support comprises a mounting plate 61 having locating holes 62 co-operating with pins (not shown) to locate it correctly over the rectangular opening 13. Catches 63 at the sides of the cabinet hold the mounting plate 61 firmly in position so that light is not admitted around it. A square hole 64 is formed in the mounting plate 61 and is framed in a channel shaped element 65 which extends perpendicularly away from the mounting plate 61. The two sides of the channel element 65 are parallel to each other and both slope downwardly towards the end of channel element 65 so that the height of the channel diminishes from the height of the hole 64 to approximately twice the thickness of the P.L.C. plate. A lid 66 is hinged to the mounting plate 61 immediately above the hole 64, and, as shown in FIGURES 6 to 8, normally rests on the downwardly sloping sides of the channel element 65. The lid can be swung up when required to give access to the surfaces of a P.L.C. plate extending through the channel element 65. The marginal edges of the lid 66 overlap the sides of the channel element 65 so that light is effectively excluded when the lid is in the position shown in the figures. The interior surfaces of the support are painted with optically flat black paint.

To adapt the cabinet for use with P.L.C. plates the supports 60 are fitted to the cabinet as shown in FIGURE 2. The resiliently biassed door 14 in each side of the cabinet is wider than the lid 66 and presses it down, as shown, into firm engagement with the sloping sides of the channel. The width of the door 14 reduces the risk of light leaking into the cabinet by way of the hinge joining the lid 66 to the mounting plate 61.

To insert the P.L.C. plate the lids 66 at opposite sides of the cabinet are raised against the bias of the door 14 and the P.L.C. plate is passed endwise into the cabinet. The channels provided by the elements 65 are aligned with one another and the floors of the channels are continuous with the top surface of the diffusing plate 27 so that as the P.L.C. plate is passed through the cabinet it is continuously supported. The widths of the channels correspond to the width of the P.L.C. plate so that it is held against lateral movement in its own plane.

The lids 66 and doors 14 are then lowered. The lengths of the lids 66 are such that their lower edges when resting on the sides of the channel elements 65 are spaced by a few millimetres above the surface coating on the P.L.C. plate so that the coating is not damaged.

The lengths and construction of the P.L.C. supports are such that leakage of light into the cabinet by way of the channels is reduced to an acceptable value.

The camera, being of variable focus type, is able to be prefocused on the plane of the coated surface of the P.L.C. plate before a photograph is taken so that a well-defined photographic record is obtained. Such prefocussing may be carried out by focussing the camera on a chromatographic plate similar to that used for the run but having a black spot formed on its surface. Alternatively the positions of the camera may be calibrated.

From the above description it will be appreciated that there has been devised a method and apparatus for providing a permanent record on film of spots of fluorescent substance on a chromatogram even when the substance is liable to photodegradation. Moreover, by measuring the intensity of the spots on the film it is also possible to calculate the amount of the substance in the original mixture under analysis.

We claim:

1. Apparatus comprising a cabinet, directional ultra-violet flash gun means in said cabinet, support means in said cabinet defining a photographic position, first light filter means for allowing a flash of ultraviolet light only to be directed towards the photographic position, openings in the walls of said cabinet on opposite sides of said photographic position, closure means associated with said wall openings, variable focus camera means directed towards said photographic position, second light filter means screening said variable focus camera means from ultra-violet light in said cabinet, a preparative-layer-chromatography plate extending at opposite end-portions through said wall openings and intermediate its ends through said photographic position, plate support means detachably fitted to said openings and supporting opposite end-portions of said plate and operating means for operating said camera means in synchronism with said flash gun means.

2. Apparatus as claimed in claim 1, in which said plate support means comprises a backing plate spanning said wall opening, a channel member extending away from said backing plate from around an aperture formed therein, and a lid hinged to said backing plate and closing the top of the channel through which said end-portion of the plate extends.

3. Apparatus as claimed in claim 1, in which said closure means each comprise a resilient rubber web fixed to the cabinet wall along the top of the wall opening and having a stiffening plate provided with a handle for opening and closing said closure means.

4. Apparatus as claimed in claim 1, including bellows means between said cabinet and said camera means.

5. Apparatus comprising a cabinet, directional ultra-violet flash gun means in said cabinet, white light radiating means in said cabinet, first ultra-violet light radiating means in said cabinet for producing ultra-violet light at a first wavelength only, second ultra-violet light radiating means for producing ultra-violet light at a second wavelength only in said cabinet, support means in said cabinet defining a photographic position, openings in walls of said cabinet on opposite sides of said photographic position, closure means associated with said wall openings, variable focus camera means directed towards said photographic position, a preparative-layer-chromatography plate extending at opposite end-portions through said wall openings and intermediate its ends through said photographic position, plate support means detachably fitted to said openings and supporting opposite end-portions of said plate, selector switch means for selecting for operation any of the following: said ultra-violet flash gun means, said white light radiating means, said first ultra-violet light radiating means and said second ultra-violet light radiating means; and operating means for operating said camera means in synchronism with said flash gun means.

6. Apparatus as claimed in claim 5, in which said selector switch means comprises a rotary switch having one switch position at which the first ultra-violet light radiating means and said second ultra-violet light radiating means are operated together.

7. Apparatus as claimed in claim 5, in which said first ultra-violet light radiating means produces light of a wavelength of 2537 angstrom units, and said second ultra-violet light radiating means produces light of a wavelength of 3650 angstrom units.

8. Apparatus as claimed in claim 5, including a glass screen having a light diffusing upper surface part which defines said photographic position.

9. Apparatus as claimed in claim 5, including hand-holes in said cabinet, and resiliently yieldable overlapping vanes closing said hand-holes and defining an iris.

References Cited

UNITED STATES PATENTS

| | | | |
|---|---|---|---|
| 2,319,079 | 5/1943 | Murray | 250—71 |
| 2,319,882 | 5/1943 | Reagan | 88—24 |
| 2,419,836 | 4/1947 | Holbrook | 88—24 |
| 2,652,754 | 9/1953 | Dedek | 95—1.1 |
| 2,787,190 | 4/1957 | McWhirter | 88—24 |
| 2,868,069 | 1/1959 | Elmore | 88—24 |
| 3,035,479 | 5/1962 | Baltosser | 88—14 |

JOHN M. HORAN, *Primary Examiner.*